United States Patent
Lin et al.

(10) Patent No.: US 9,503,411 B1
(45) Date of Patent: Nov. 22, 2016

(54) RANKING POSTS BASED ON A PRIORITIZED LIST OF RECIPIENTS

(75) Inventors: Jennifer W. Lin, San Jose, CA (US); Kaisuke Nakajima, San Jose, CA (US)

(73) Assignee: Google Inc., Mountain View, CA (US)

( * ) Notice: Subject to any disclaimer, the term of this patent is extended or adjusted under 35 U.S.C. 154(b) by 738 days.

(21) Appl. No.: 13/600,163

(22) Filed: Aug. 30, 2012

(51) Int. Cl.
*H04L 12/58* (2006.01)
*G06F 17/30* (2006.01)

(52) U.S. Cl.
CPC ........... *H04L 51/32* (2013.01); *G06F 17/3053* (2013.01)

(58) Field of Classification Search
None
See application file for complete search history.

(56) References Cited

U.S. PATENT DOCUMENTS

| | | | |
|---|---|---|---|
| 7,831,684 B1* | 11/2010 | Lawler et al. | 709/217 |
| 8,332,512 B1* | 12/2012 | Wu et al. | 709/224 |
| 8,606,792 B1* | 12/2013 | Jackson et al. | 707/748 |
| 8,825,759 B1* | 9/2014 | Jackson et al. | 709/204 |
| 2005/0159998 A1* | 7/2005 | Buyukkokten | G06Q 50/01 705/319 |
| 2009/0222551 A1* | 9/2009 | Neely et al. | 709/224 |
| 2012/0042020 A1* | 2/2012 | Kolari et al. | 709/206 |
| 2013/0139048 A1* | 5/2013 | Dhawan | G06Q 30/0278 715/234 |

* cited by examiner

*Primary Examiner* — Joe Chacko
(74) *Attorney, Agent, or Firm* — McDermott Will & Emery LLP

(57) ABSTRACT

Various aspects of the subject technology relate to systems, methods, and machine-readable media for prioritizing content (e.g., a post on a social networking site) based on a prioritized list of recipients. According to some aspects, a system receives a post associated with a prioritized list of recipients, wherein the prioritized list of recipients comprises an assignment, made by a publisher of the post, of a recipient user to a priority category, prioritizes the post based on the priority category assigned to the recipient user, and provides for display of the post in a user interface associated with the recipient user based on the score for the post.

15 Claims, 5 Drawing Sheets

RANKING POSTS BASED ON A PRIORITIZED LIST OF RECIPIENTS

BACKGROUND

Some social networking services allow a user to organize other users into social circles (e.g., a group of users). These social circles can include a user's personal contacts, professional contacts, other users of the social network, or a combination of these. The social networking services may also allow a sender (e.g., a user publishing content) to publish content in a post to be viewed by users receiving the sender's post (e.g., viewing users).

A viewing user receiving the sender's posts, as well as posts from other sources, usually see the posts in a user interface (e.g., a website for the viewing user provided by a social networking service) in chronological order. For example, the most recently published post may appear on the top of the user interface while older posts appear below.

SUMMARY

Various aspects of the subject technology relate to a system for prioritizing content based on a prioritized list of recipients. The system may include one or more processors and a machine-readable medium comprising instructions stored therein, which when executed by the one or more processors, cause the one or more processors to perform operations. The operations may include receiving content associated with a prioritized list of recipients, wherein the prioritized list of recipients comprises an assignment, made by a publisher of the content, of a recipient user to a priority category, calculating a score for the content based on the priority category assigned to the recipient user, and providing for display of the content in a user interface associated with the recipient user based on the score for the content.

These and other aspects can include one or more of the following features. In some aspects, the content and the prioritized list of recipients are received from a client device associated with the publisher of the content.

In some aspects, the calculating of the score for the content is further based on at least one of a date and time associated with the content, similarities between publisher of the content and the recipient user, how close the publisher is to the recipient user on a social graph, content of the content, characteristics of the publisher, or characteristics of the recipient user.

In some aspects, the priority category assigned to the recipient user is associated with a priority value and the operations can further include modifying the priority value associated with the priority category based on at least one of a distribution of recipient users in the prioritized list of recipients or recipient user interactions with the content. In some aspects, the providing of the content for display in the user interface includes generating the user interface comprising the content as well as other content and transmitting the user interface to a client device associated with the recipient user, wherein the user interface is to be displayed on the client device.

Other aspects of the subject technology relate to a method for prioritizing a post based on a prioritized list of recipients. The method may include receiving a post associated with a prioritized list of recipients, wherein the prioritized list of recipients comprises an assignment, made by a publisher of the post, of a recipient user to a priority category, calculating a score for the post based on the priority category assigned to the recipient user, and providing for display of the post in a user interface associated with the recipient user based on the score for the post.

These and other embodiments can include one or more of the following features. In some aspects, the method also includes generating the prioritized list of recipients for the post. In some aspects, the post and the prioritized list of recipients are received from a client device associated with the publisher of the post.

In some aspects, the calculating of the score for the post is further based on a date and time associated with the post. The calculating of the score for the post may be further based on at least one of similarities between publisher of the post and the recipient user, how close the publisher is to the recipient user on a social graph, content of the post, characteristics of the publisher, or characteristics of the recipient user.

In some aspects, the priority category assigned to the recipient user is associated with a priority value, and wherein the calculating of the score for the post is based on the priority value. The method may also include modifying the priority value associated with the priority category based on at least one of a distribution of recipient users in the prioritized list of recipients or recipient user interactions with the post.

In some aspects, the providing for the display of the post in the user interface can include generating the user interface comprising a number of posts and transmitting the user interface to a client device associated with the recipient user, wherein the user interface is to be displayed on the client device. Furthermore, the number of posts in the user interface may be ordered based on scores for the number of posts.

In some aspects, the post comprises at least one of a uniform resource locator (URL) link, a picture, a video, text, or an audio file.

Various aspects of the subject technology relate to a non-transitory machine-readable medium comprising instructions stored therein, which when executed by a machine, cause the machine to perform operations for prioritizing a post based on a prioritized list of recipients. The operations may include receiving a post associated with a prioritized list of recipients, wherein the prioritized list of recipients comprises an assignment, made by a publisher of the post, of a recipient user to a priority category, prioritizing the post based on the priority category assigned to the recipient user, and providing for display of the post in a user interface associated with the recipient user based on the score for the post.

These and other embodiments can include one or more of the following features. In some aspects, the operations further include generating the prioritized list of recipients. In some aspects, the priority category assigned to the recipient user is associated with a priority value used to prioritize the post. In some aspects, the providing of the post for display in the user interface includes generating the user interface comprising a number of posts, wherein the number of posts in the user interface are ordered based on scores for the number of posts and transmitting the user interface to a client device associated with the recipient user, wherein the user interface is to be displayed on the client device.

These and other embodiments may provide one or more of the following advantages. By prioritizing the posts to be shown to a recipient user based on input from a publishing user of each post, posts that may be more important may be more easily identified by the recipient user. Furthermore, the publishing user also is able to have more control over how a post is viewed by recipient users.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details.

A social networking site may allow a sender to determine, for each post that the sender publishes, which viewing users are authorized to view the sender's post. The post may include such things as uniform resource locator (URL) links, pictures, video, text, audio, or any other content. The post may also include a combination of different content. A viewing user may logon, or otherwise access, the social networking site to view posts that the viewing user is authorized to view. However, in some cases, a viewing user can be inundated with a large number of posts such that the viewing user might not be able to quickly identify important posts.

Various aspects of the subject technology relate to systems and methods for prioritizing one or more posts to be shown to a viewing user based on a prioritized list of recipients for each post. According to some aspects, the prioritized list of recipients is set by the sender (e.g., the author or publisher) of the post. For example, when a sending user publishes a post, the sending user may specify a prioritized list of recipients. By prioritizing the posts to be shown to a viewing user based on input from the sender of each post, posts that may be more important may be more easily identified by the viewing user.

Figure 1:
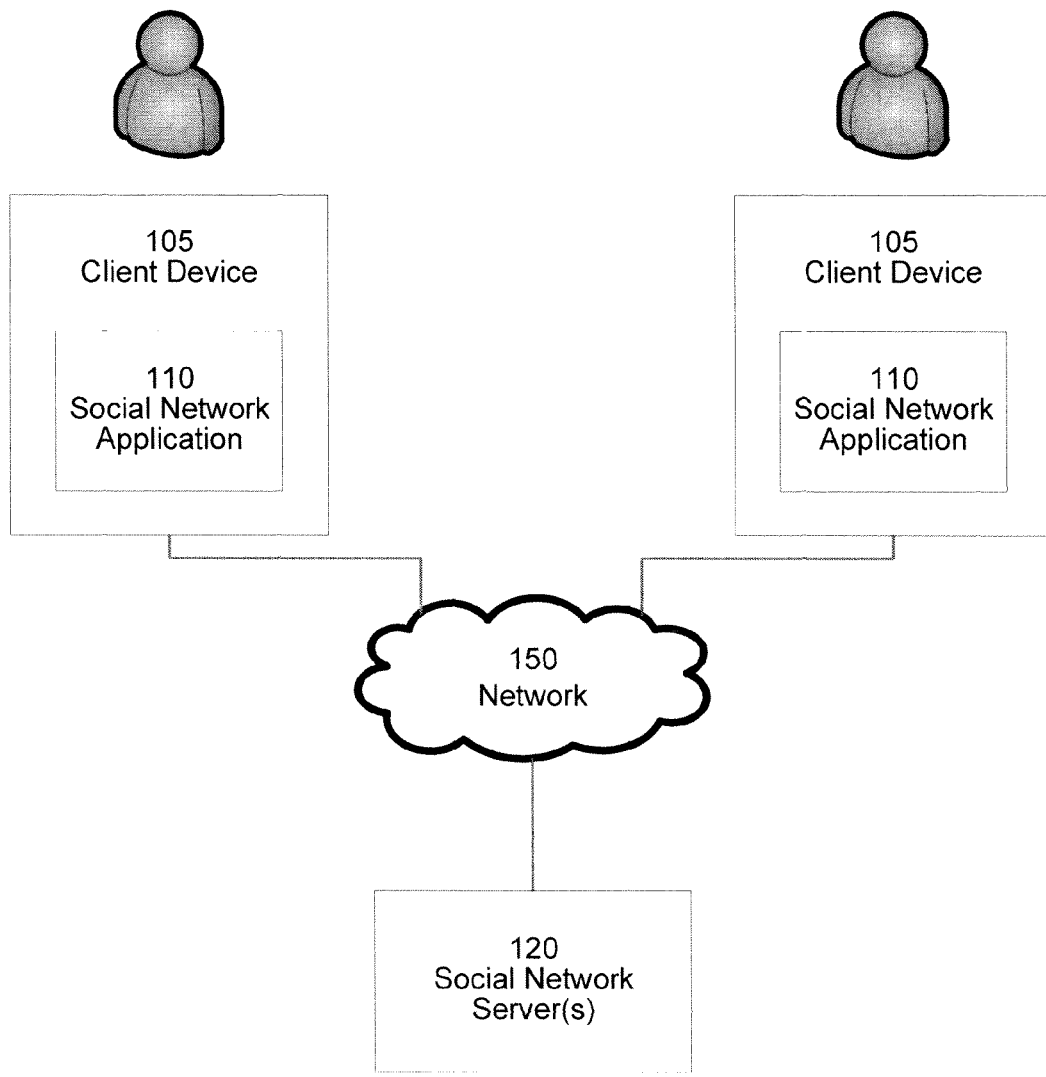
FIG. 1 is a block diagram illustrating an example networked environment in which a social networking site may exist, in accordance with various aspects of the subject technology.

FIG. 1 is a block diagram illustrating an example networked environment 100 in which a social networking site may exist, in accordance with various aspects of the subject technology. Although FIG. 1 illustrates a client-server network environment 100, other aspects of the subject technology may include other configurations including, for example, peer-to-peer or single system environments. The network environment includes one or more client devices 105 and one or more social network servers 120 connected via a network 150 (e.g., the Internet).

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Each client device 105 may be any machine able to communicate with the social network servers 120 via the network 150. Client devices 105 may include desktop computers, laptops, mobile devices (e.g., smart phones, tablets, personal digital assistants (PDAs), etc.), or any other machine with a processor, memory, and communications capabilities.

Each client device 105 may also include a social network application 110, such as a web browser or a dedicated program (e.g., an "app" for a mobile device). The social network applications 110 may be configured to enable a user to interact with a social networking site hosted by the social network servers 120 and access the functionalities provided by the social networking service. For example, a sender user may be able to submit, to the network servers 120, content to be published in posts using a client device 105. A viewing user, on the other hand, may use a client device 105 to logon to a social network site hosted by the network servers 120 and retrieve posts to that the viewing user is authorized to access.

The one or more social network servers 120 may be systems or devices having a processor, a memory, and communications capability that may be used host a social network site. The social network servers 120 may also host a system that is configured to prioritize a post to be shown to a viewing user based on a prioritized list of recipients for the post.

Figure 2:
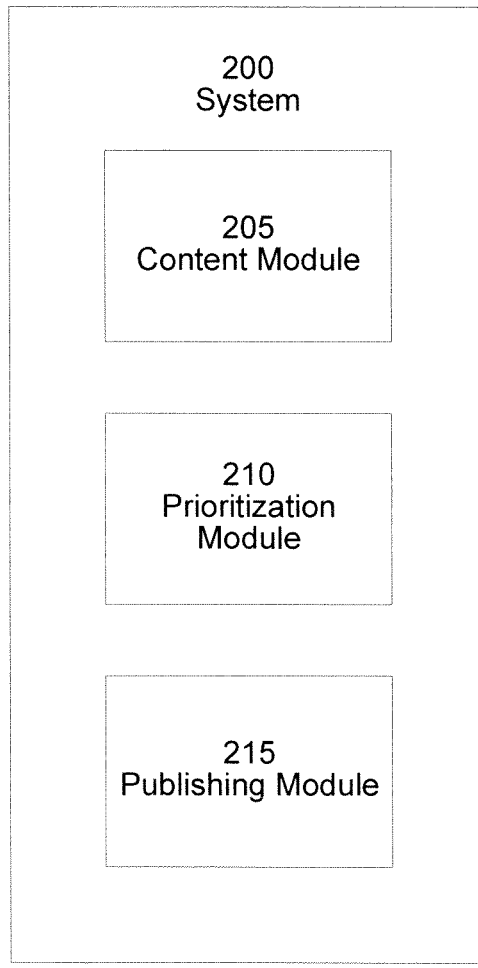
FIG. 2 is a block diagram illustrating an example system configured to prioritize a post to be shown to a viewing user based on a prioritized list of recipients for the post, in accordance with various aspects of the subject technology.

FIG. 2 is a block diagram illustrating an example system 200 configured to prioritize a post to be shown to a viewing user based on a prioritized list of recipients for the post, in accordance with various aspects of the subject technology. The system 200 may include a content module 205, a prioritization module 210, and a publishing module 215.

Figure 3:
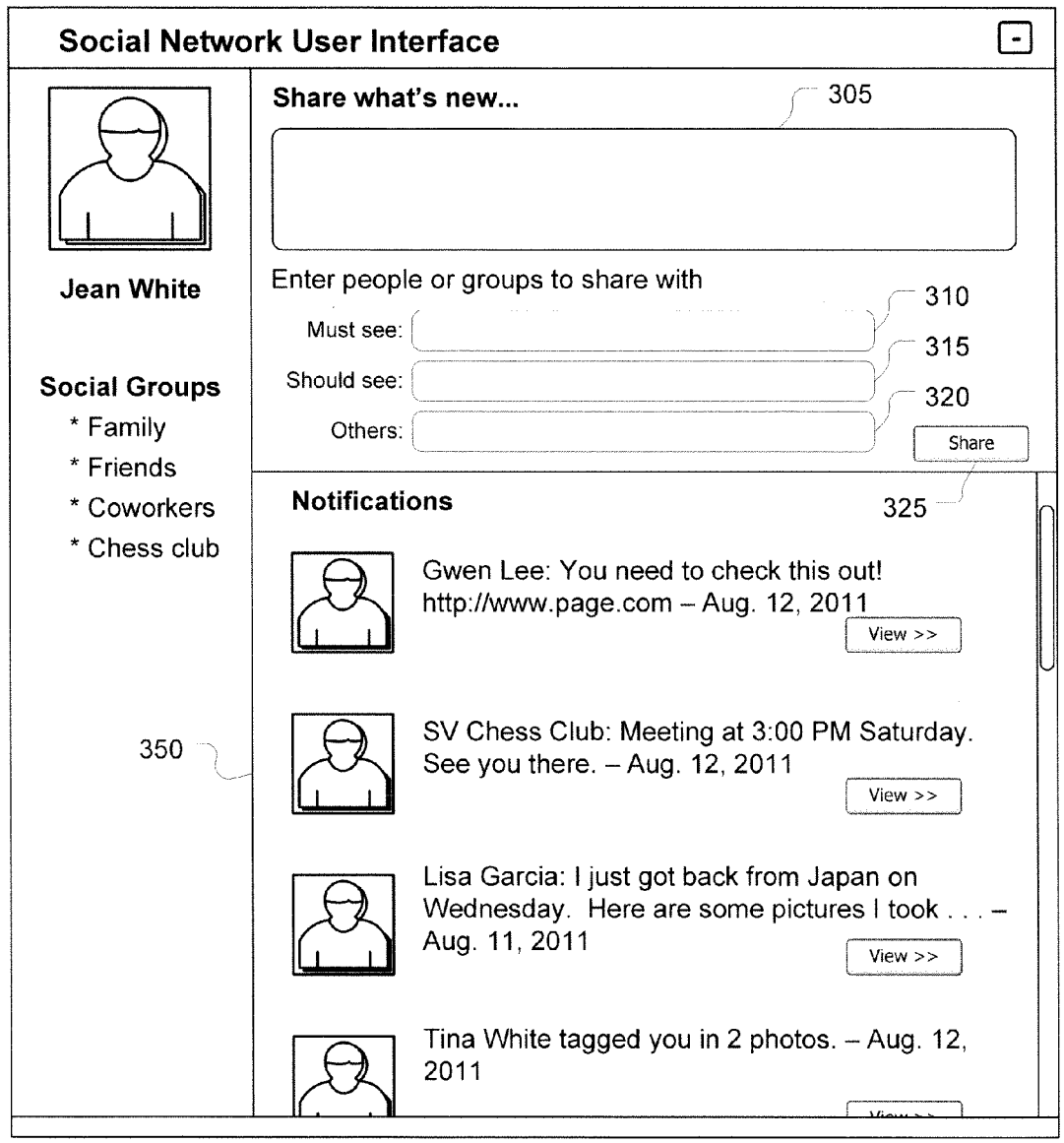
FIG. 3 is an example user interface in which a user may create a post, in accordance with some aspects of the subject technology.

The content module 205 may be configured to receive a post (e.g., published content) associated with a prioritized list of recipients. For example, a sender (e.g., a user creating a post) may logon to a social networking site on their client device 105 and create a post in a user interface. FIG. 3 is an example user interface 300 in which a sender may create a post, in accordance with aspects of the subject technology.

The user interface 300 may include an interface element 305 that allows the sender to create a post using various content items (e.g., links, text, photos, videos, etc.). The content items may be inputted by the sender, uploaded from the client device 105, or retrieved from other locations over the network 150.

The user interface 300 may also include one or more interface elements that allow the sender to indicate which users or groups of users are authorized to receive the post and assign a priority to each of the recipients. For example, in FIG. 3, prioritized interface elements 310, 315, and 320 allow the sender to indicate which users or groups of users are authorized to view the posts. Each prioritized interface element 310, 315, and 320 may allow the sender to assign a priority category for each user or group of users that is to receive the post.

For example, the sender may enter references (e.g., names, screen names, email addresses, or other identifying information) of the users or groups that, in the sender's opinion, "must see" the post in prioritized interface element 310. The references in the "must see" prioritized interface element 310 may correspond to a high priority category. The sender may also enter references of the users or groups that, in the sender's opinion, "should see" the post in prioritized interface element 315. The references in the "should see" prioritized interface element 315 may correspond to a moderate priority category. Similarly, the sender may also enter references of the "other" users or groups that are also authorized to view the post in prioritized interface element 320. The references in the "other" prioritized interface element 320 may correspond to a low priority category.

According to other aspects, however, additional priority categories may exist (e.g., a "no priority" category). Furthermore, in other aspects, the user interface 300 may not use priority categories at all. Instead, a sender may enter an ordered list of recipients in an interface element wherein the most important recipients are listed first.

After the sender creates a post and indicates which users are authorized to receive the post, the sender may publish the post by, for example, pressing the share button 325 in user interface 300. In response to the sender pressing the share button 325, the post may be sent to the content module 205 of the system 200 in FIG. 2. The content module 205 may be configured to perform any processing tasks needed to format the post and/or store the post in a data repository such that the post may be provided to the authorized recipients. For example, the post may be stored as a record in a database or an entry in a table.

A prioritized list of recipients may also be generated, either on the sender's client device 105 or by the content module 205, based on the recipients indicated in the prioritized interface elements 310, 315, and 320. The prioritized list of recipients may, according to some aspects, include associations of each recipient to a priority category, as assigned by the sender in the prioritized interface elements 310, 315, and 320.

The prioritization module 210 may be configured to calculate a score for a post based on the priority category assigned to a recipient user. The score may also be calculated based on a number of other factors such as the date and time that a post was published, similarities between the sending user and the recipient user, how close the sending user is to the recipient user on a social graph, the content of the post, characteristics of the sender, or characteristics of the recipient user.

The publishing module 215 is configured to provide users with posts the users are authorized to receive. For example, a user may log on to a social networking site and attempt to view a user interface (e.g., a web page) that contains a number of posts that the user is authorized to receive. The publishing module 215 may retrieve the posts that the user is authorized to view (e.g., the user is listed as a recipient of the post) and prioritize the posts based on the post score associated with each of the posts.

The publishing module 215 may then generate a user interface showing the prioritized posts and transmit the user interface to the user. According to some aspects, the user interface may include a number posts that are ordered based on their post score. For example, in FIG. 3, the user interface 300 includes interface element 350 containing a number of posts that the user "Jean White" is authorized to view. In user interface element 350, posts with the higher post score appear above posts with lower post scores.

In another aspect, posts with higher post scores or with post scores above a threshold post score may appear in a separate interface element within the user interface while other posts that the user is authorized to receive appear in another interface element. According to another aspect, the posts in the user interface element may be associated with a visual indication that indicates the post score associated with each post. For example, the actual post score for each post may be listed next to the post, posts may appear with icons or symbols that are indications of their post score, or posts may be color coded based on their post scores.

Figure 4:
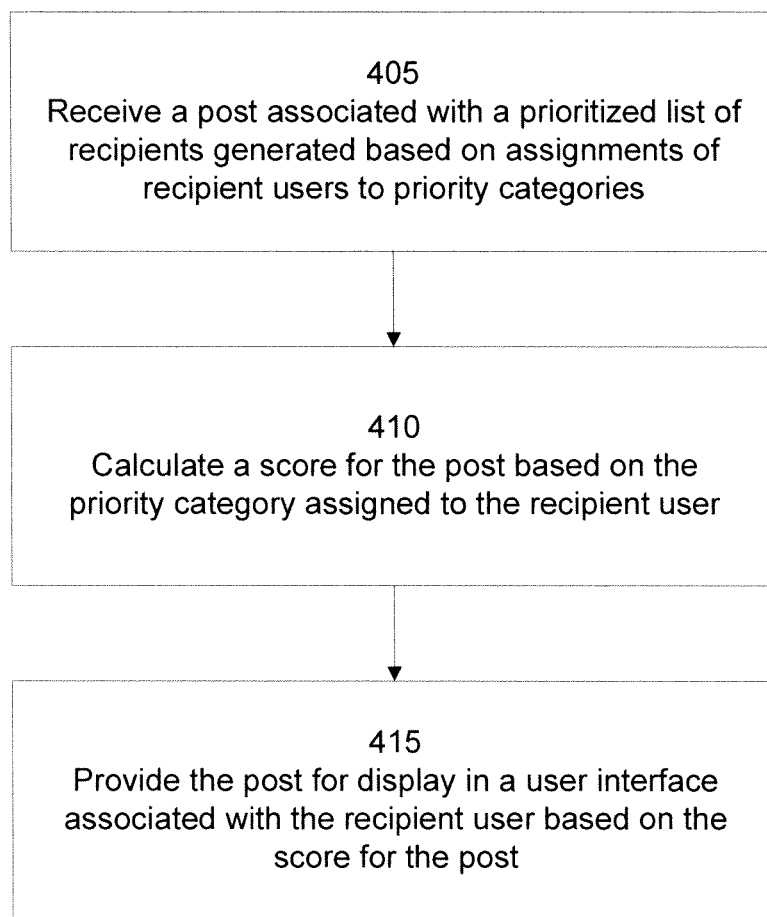
FIG. 4 is a flow chart illustrating an example process for prioritizing a post based on a prioritized list of recipients, in accordance with various aspects of the subject technology.

FIG. 4 is a flow chart illustrating an example process 400 for prioritizing published content based on a prioritized list of recipients, in accordance with various aspects of the subject technology. Although the steps in process 400 are shown in a particular order, certain steps may be performed in different orders or at the same time. In addition, although the process steps of FIG. 4 are described with reference to the components of the system 200 in FIG. 2, the steps are not limited to being performed by these components.

At step 405, the content module 205, receives a post (or any other content to be published). The content is associated with a prioritized list of recipients generated based on assignments, made by the publisher of the post, of recipient users to priority categories. At step 410, the prioritization module 210 may calculate a score for the post based on, among other things, the priority categories of the recipient users of the post.

According to some aspects, scores may be calculated for all priority categories that a recipient of a post may be assigned to. The calculated scores may then be stored in a database or table for later use when a recipient attempts to retrieve the post for viewing. In other aspects, however, a score for a particular priority category of a post may be calculated on-the-fly in response to a post recipient associated with the particular priority category attempting to retrieve the post for viewing.

Although other calculations may be used, one example calculation used by the prioritization module 210 to calculate post scores may be in the format provided below:

$$\text{Post Score} = (w1 \cdot P) + (w2 \cdot f2) + (w3 \cdot f3) \ldots \quad \text{Equation (1)}$$

where P is a priority value based on the viewing user's priority category in the prioritized list of recipients and f2, and f3 are other factors associated with the importance of a post, and w1, w2, and w3 are weights assigned to the factors. As discussed above, the factors may include, but are not limited to, how much time has elapsed since a post was created, similarities between the publisher of the post and the recipient user, social graph information associated with the publisher and/or the recipient user, the content of the post (e.g., keywords in the post or the type of content in the post), characteristics of the sender, or characteristics of the recipient user.

The priority value P may be, for example, 1.0 for viewing users in a high priority category, 0.7 for viewers in a moderate priority category, and 0.3 or 0 for viewers in a low priority category. In other aspects, a larger number of priority categories may be used along with different priority values, which may be predetermined or determined based on other variables.

At step 415, the publishing module 215 may provide the post for display along with other posts in a user interface associated with the recipient user based on the score for the post. For example, as discussed above, the recipient user may log on to a social networking site, open an application, or otherwise request to view posts that the user is authorized to receive. The publishing module 215 may identify the posts that the user is authorized to view, prioritize the identified posts based on the post score associated with each of the posts, and generate a user interface that includes the prioritized posts.

According to some aspects, the priority value used to calculate the post score for a post may be modified based on the distribution of the recipients in the prioritized list of recipients. For example, each priority category may have a default priority value. For example, the default priority value for a high priority category may be 1, the default priority value for a moderate priority category may be 0.7, and the default priority value for a low priority category may be 0.3.

However, if the publisher of a post identifies 1000 recipient users in the high priority category and no users in the other priority categories, the priority value for the high priority category may be decreased a certain value or a certain percentage. In another example, if the publisher of a post identifies 30 recipient users in a low priority category and a single recipient user in a high priority category, the priority value for the high priority category may be increased by a certain value or percentage. According to other aspects, the priority values for the priority categories may be valued based on the relationship (e.g., a ratio) between the number of recipients in each priority category.

According to some aspects, the priority value used to calculate the post score for a post may also or alternatively be modified based on recipient user interactions with the post. For example, if post recipients in a moderate priority category interact with the post in a certain way, the priority value for the moderate priority category for the post may be incremented a certain amount. Similarly, if post recipients in a low priority category interact with the post in a certain way, the priority value for the low priority category for the post may be incremented a certain amount. Other interactions (e.g., showing disapproval of a post or ignoring a post) may cause the priority value to decrease as well.

The types of interactions that may be used to modify priority values may include commenting on the post, republishing the post, reading the post, ignoring a post, showing approval of a post (e.g., "liking" a post or giving a post a "+1"), showing disapproval of a post, or any other detectable interaction with the post. Furthermore, the amount a priority value may be increased or decreased may depend on the type of interaction. For example, commenting or republishing a post may cause the priority value to increase a greater amount than simply reading the post.

Although some aspects of the subject technology are discussed with respect to posts on a social networking site, other aspects of the subject technology relate to other forms of published content as well. Other forms of published content may include, for example, emails, text messages, or other digital communications.

According to some aspects of the subject technology, certain users or groups of users may be associated with a default priority category assigned by a publisher of a post or by an administrator. Accordingly, when the publisher indicates that a particular user or group is a recipient of a post, the particular user or group will be placed in the prioritized list of recipients for the post based on the user's or group's default priority.

Figure 5:
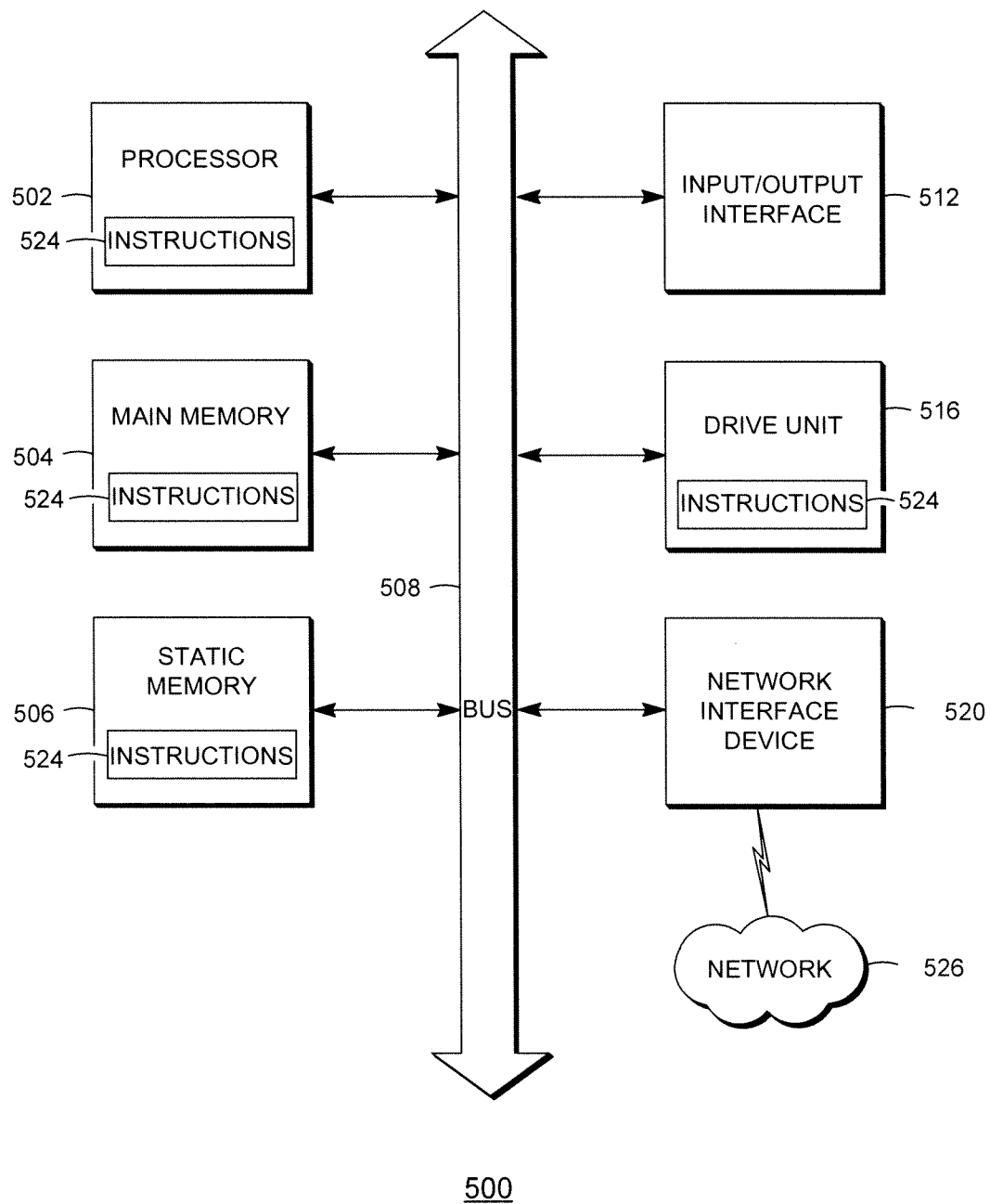
FIG. 5 is a block diagram illustrating an example computer system with which any of the devices, servers, or systems discussed herein may be implemented, in accordance with some aspects of the subject technology.

FIG. 5 is a block diagram illustrating an example computer system 500 with which any of the devices, servers, or systems discussed herein may be implemented, in accordance with some aspects of the subject technology. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method comprising:
   receiving a post associated with a prioritized list of recipient users, wherein the prioritized list of recipient users is generated at a client device associated with a sending user of the post prior to the post being sent from the client device, wherein the prioritized list of recipient users comprises different priority categories respectively assigned to at least two recipient users by the sending user of the post;
   calculating a score for the post based on a priority value associated with the priority category assigned to one of the at least two recipient users, the priority value corresponding to a first factor of a plurality of factors associated with an importance of the post;
   assigning a first weight to the priority value;
   assigning a second weight to a second factor of the plurality of factors, the score being calculated based on the priority value with the assigned first weight and the second factor with the assigned second weight; and
   providing for display the post in a user interface associated with the one of the at least two recipient users based on the score for the post.

2. The computer-implemented method of claim 1, wherein the post and the prioritized list of recipient users are received from the client device associated with the sending user.

3. The computer-implemented method of claim 1, wherein the calculating of the score for the post is further based on a date and time associated with the post.

4. The computer-implemented method of claim 1, wherein the calculating of the score for the post is further based on at least one of similarities between the sending user and the one of the at least two recipient users, how close the sending user is to the one of the at least two recipient users on a social graph, content of the post, characteristics of the sending user, or characteristics of the one of the at least two recipient users.

5. The computer-implemented method of claim 1, further comprising modifying the priority value based on at least one of a distribution of the at least two recipient users in the prioritized list of recipient users or recipient user interactions with the post.

6. The computer-implemented method of claim 1, wherein the providing for the display of the post in the user interface comprises:
   generating the user interface comprising a number of posts; and
   transmitting the user interface to a client device associated with the one of the at least two recipient users, wherein the user interface is to be displayed on the client device.

7. The computer-implemented method of claim 6, wherein the number of posts in the user interface are ordered based on scores for the number of posts.

8. The computer-implemented method of claim 1, wherein the post comprises at least one of a uniform resource locator (URL) link, a picture, a video, text, or an audio file.

9. A system comprising: one or more microprocessors; and
   a non-transitory machine-readable medium comprising instructions stored therein, which when executed by the one or more microprocessors, cause the one or more microprocessors to perform operations comprising:
   receiving content associated with a prioritized list of recipient users, wherein the prioritized list of recipient users is generated at a client device associated with a sending user of the content prior to the content being sent from the client device, wherein the prioritized list of recipient users comprises different priority categories respectively assigned to at least two recipient users by the sending user of the content;
   calculating a score for the content based on a priority value associated with the priority category assigned to one of the at least two recipient users, the priority value corresponding to a first factor of a plurality of factors associated with an importance of the content;

assigning a first weight to the priority value;

assigning a second weight to a second factor of the plurality of factors, the score being calculated based on the priority value with the assigned first weight and the second factor with the assigned second weight; and providing for display the content in a user interface associated with the one of the at least two recipient users based on the score for the content.

10. The system of claim 9, wherein the content and the prioritized list of recipient users are received from the client device associated with the sending user of the content.

11. The system of claim 9, wherein the calculating of the score for the content is further based on at least one of a date and time associated with the content, similarities between the sending user of the content and the one of the at least two recipient users, how close the sending user is to the one of the at least two recipient users on a social graph, content of the content, characteristics of the sending user, or characteristics of the one of the at least two recipient users.

12. The system of claim 11, wherein the operations further comprise modifying the priority value associated with the priority category based on at least one of a distribution of recipient users in the prioritized list of recipient users or recipient user interactions with the content.

13. The system of claim 9, wherein the providing of the content for display in the user interface comprises:

generating the user interface comprising the content as well as other content; and transmitting the user interface to a client device associated with the one of the at least two recipient users, wherein the user interface is to be displayed on the client device.

14. A non-transitory machine-readable medium comprising instructions stored therein, which when executed by a machine, cause the machine to perform operations comprising:

receiving a post associated with a prioritized list of recipient users, wherein the prioritized list of recipient users is generated at a client device associated with a sending user of the post prior to the post being sent from the client device, wherein the prioritized list of recipient users comprises different priority categories respectively assigned to at least two recipient users by the sending user of the post;

prioritizing the post based on a priority value associated with the priority category assigned to one of the at least two recipient users, the priority value corresponding to a first factor of a plurality of factors associated with an importance of the post;

assigning a first weight to the priority value;

assigning a second weight to a second factor of the plurality of factors;

calculating a score based on the priority value with the assigned first weight and the second factor with the assigned second weight; and providing for display the post in a user interface associated with the one of the at least two recipient users based on the score for the post.

15. The non-transitory machine-readable medium of claim 14, wherein the providing of the post for display in the user interface comprises:

generating the user interface comprising a number of posts, wherein the number of posts in the user interface are ordered based on scores for the number of posts; and transmitting the user interface to a client device associated with the one of the at least two recipient users, wherein the user interface is to be displayed on the client device.

* * * * *